(12) United States Patent
Chang

(10) Patent No.: US 6,795,387 B2
(45) Date of Patent: Sep. 21, 2004

(54) DYNAMIC SPEED CONTROL METHOD FOR STORAGE DEVICE

(75) Inventor: Kun-Chang Chang, Taichung (TW)

(73) Assignee: Lite-On It Corp. (TW)

( * ) Notice: Subject to any disclaimer, the term of this patent is extended or adjusted under 35 U.S.C. 154(b) by 366 days.

(21) Appl. No.: 10/055,748

(22) Filed: Jan. 22, 2002

(65) Prior Publication Data

US 2002/0191514 A1 Dec. 19, 2002

(30) Foreign Application Priority Data

Jun. 15, 2001 (TW) .................................. 90114548 A

(51) Int. Cl.⁷ .............................................. G11B 9/00
(52) U.S. Cl. ................. 369/53.3; 369/47.38; 360/73.01
(58) Field of Search ........................... 369/53.3, 47.38; 360/73.01

(56) References Cited

U.S. PATENT DOCUMENTS

| | | | | |
|---|---|---|---|---|
| 4,868,819 A | * | 9/1989 | Kimura | 369/30.13 |
| 5,636,196 A | * | 6/1997 | Kumagai | 369/47.48 |
| 6,009,053 A | * | 12/1999 | Ota et al. | 369/44.32 |
| 6,137,757 A | * | 10/2000 | Kinoshita | 369/47.41 |
| 6,587,411 B2 | * | 7/2003 | Hayashi | 369/47.29 |
| 6,628,595 B1 | * | 9/2003 | Sasa et al. | 369/59.12 |

* cited by examiner

Primary Examiner—Gautam R. Patel
(74) Attorney, Agent, or Firm—Raymond Sun

(57) ABSTRACT

A method for controlling the rotational speed of a disk player includes first calculating the proportion of time which the disk player is reading data from the disk during a unit time T. Thereafter, the method increases the rotational speed of the disk player if the proportion of time that the disk player spends reading data from the disk is greater than a first threshold during each of m consecutive units of time T, and decreases the rotational speed of the disk player if the proportion of time that the disk player spends reading data from the disk is less than a second threshold during each of n consecutive units of time T.

5 Claims, 2 Drawing Sheets

DYNAMIC SPEED CONTROL METHOD FOR STORAGE DEVICE

BACKGROUND OF THE INVENTION

1. Field of the Invention

The present invention pertains to a method that dynamically adjusts the rotational speed of a disk drive according to the data transfer rate from the computer system and the disk player.

2. Description of the Prior Art

The increase in the operating speed of personal computers (PCs) has been accompanied by improvements in the transfer speed and capacity of peripheral devices. Under these circumstances, computer storage media have also become multifunctional, instead of simply functioning as a means for the storage of information. For example, the contents of a CD-ROM disk can be music, data, or video. However, different applications may have large differences in the transfer rate between the optical disk player and the PC. For example, when a VCD movie is playing, the transfer rate is only 176 Kbyte/sec, that is, the so-called unit speed. On the other hand, the transfer rate of a document file can exceed 10 Mbyte/sec, an order of magnitudes.

In order to ensure that motor-driven disk drives (also referred to herein as disk players), such as for CD-ROMs, magnetic disks, or hard disks, can provide the transfer rate required by the computer, the motor is usually set to a rotational speed that is much higher than necessary. Thus, in conventional disk drives, it is very common for the motor to rotate at a very high speed even when the transfer rate required by the computer is fairly low. This results not only in inefficient power consumption, but also in noise and vibration generated by the motor when it rotates at high speeds. In addition, reading data at too high a speed may also result in the deterioration of the performance of the disk player.

Therefore, as described above, conventional high-speed disk players typically read data from disks at a set (i.e., fixed) and relatively high rotational speed. Regarding the setting of the motor speed of the disk player, the difficulty is how to calculate the computer system transfer rate. Since the transfer rate between the computer system and the disk player is affected by the time that the disk player itself spends reading data, one cannot simply assume that the amount of data transferred per unit time is the transfer rate.

Thus, there remains a need for disk drive and method that overcomes the drawbacks set forth above.

SUMMARY OF THE DISCLOSURE

It is an object of the present invention to provide a disk drive and method that avoids inefficient power consumption, noise and vibration generated by a disk drive motor that rotates at unnecessarily high speeds.

It is another object of the present invention to provide a disk drive and method that maintains the motor speed at an efficient level.

It is yet another object of the present invention to provide a disk drive and method whose motor speed is dynamically adjusted in accordance with the change in the transfer rate of data required by the computer system.

In order to accomplish the objects of the present invention, the present invention provides a method for adjusting the rotational speed of a disk player, which includes first calculating the proportion of time which the disk player is reading data from the disk during a unit time T. Thereafter, the method increases the rotational speed of the disk player if the proportion of time that the disk player spends reading data from the disk is greater than a first threshold during each of m consecutive units of time T, and decreases the rotational speed of the disk player if the proportion of time that the disk player spends reading data from the disk is less than a second threshold during each of n consecutive units of time T.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides a method for adjusting the rotational speed of a disk player, which includes first calculating the proportion of time which the disk player is reading data from the disk during a unit time T. Thereafter, the method increases the rotational speed of the disk player if the proportion of time that the disk player spends reading data from the disk is greater than a first threshold during each of m consecutive units of time T, and decreases the rotational speed of the disk player if the proportion of time that the disk player spends reading data from the disk is less than a second threshold during each of n consecutive units of time T.

The present invention adopts a few assumptions in its method for adjusting the motor speed of a disk player. Instead of setting the motor speed by directly calculating the amount of data transfer between the computer system and the disk player, a method based on relative speed is used to determine whether to increase or decrease the motor speed. The assumptions are as follows (1) If a disk player only spends a small amount of time during a given time period reading data from a disk, it means that the reading speed of the disk player is higher than is required by the computer system, and therefore the disk player need only spend a small portion of the time reading from the disk to satisfy the required amount of data transfer. In this case, the motor speed should be decreased.

(2) On the other hand, if during most of that given period of time, the disk player is reading data from the disk, then the reading speed of the disk player is less than that required by the computer system. In that case, the motor speed should be increased.

Figure 1:
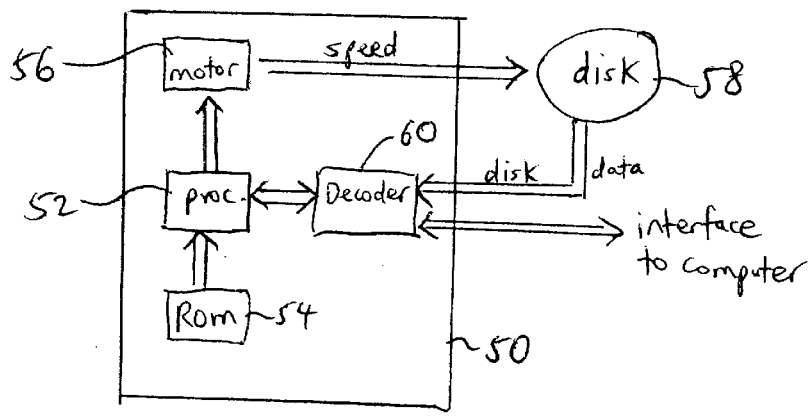
FIG. 1 is a simple block diagram illustrating the primary elements of the system of the present invention.

FIG. 1 illustrates the primary elements of the system of the present invention. A disk player or drive 50 has a processor 52 that has an input coupled to a ROM 54 that stores all settings and the speed control software of the present invention. The processor 52 controls a motor 56 that drives the reading of a disk 58, including the reading speed of the disk 58. A decoder 60 is coupled to both the processor 52 and the disk 58 to facilitate the transfer of data from the disk 58 to the processor 52. The decoder 60 can also be coupled to an interface of a PC or other device which is coupled to the disk drive 50. The settings stored in the ROM 54 can include T, H, L, M and N, which are described below.

In operation, after a predetermined period of time T, the proportion of time that the disk player 50 spent reading data from the disk 58 is calculated, and the proportions of the data reading times in the previous m or n units of time periods T are also checked. If, during each such previous m units of time periods T, the proportion of time that the disk player 50 spends reading data from the disk 58 is greater than the threshold H for increasing the rotational speed, then the rotational speed for the motor 56 is increased. On the other hand, if, during each previous n units of time periods T, the proportion of time that the disk player 50 spends reading data from the disk 58 is less than the threshold L for decreasing the rotational speed, then the rotational speed for the motor 56 is decreased. In one non-limiting example, H can be 90%, and L can be 50%.

Figure 2:
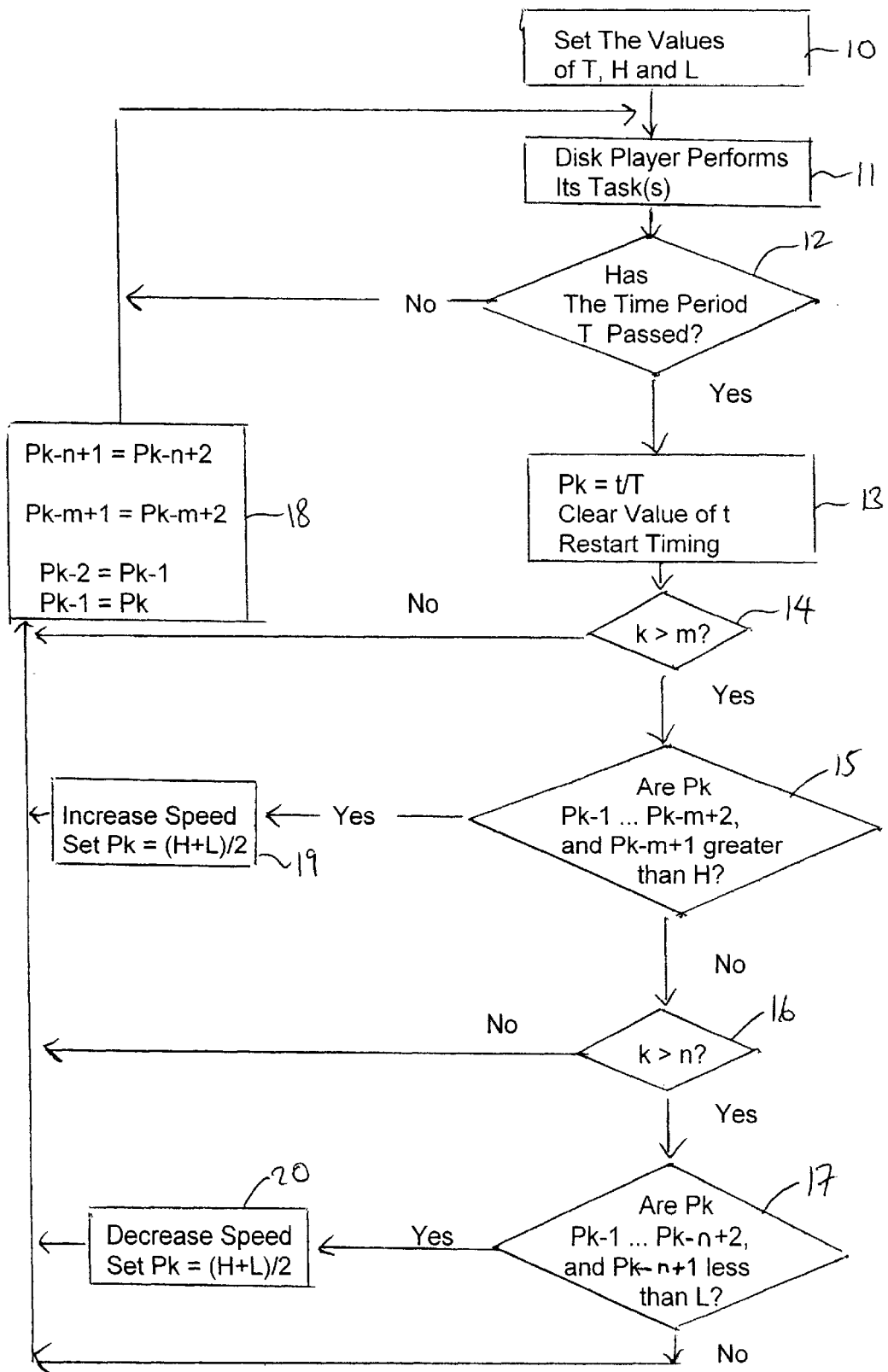
FIG. 2 is a flowchart of a method according to the present invention.

FIG. 2 is a flowchart that illustrates the method according to one embodiment of the present invention. The present invention presents a dynamic speed control method with a variable transfer rate. Under the assumption that n=m, the method includes the following steps:

Step 10: In this step, the values of T, H, and L are preset and the timing is started. Here, T is a constant time period, and H and L are the limit condition values to determine when to increase and decrease, respectively, the rotational speed of the motor. H is usually set at a value that is greater than L, and the values between H and L can be considered to represent the optimum rotational speeds. H and L can be adjusted to obtain the optimum rotational speeds.

Step 11: In this step, the disk player 50 is coupled to the system circuit of FIG. 1 to perform its given task, such as executing commands issued by the computer. Processing then proceeds to step 12.

Step 12: In this step, it is determined whether the time period T has passed. If yes, processing proceeds to step 13. If no, processing returns to step 11.

Step 13: in this step, Pk (i.e., the proportion of the time during which the disk player 50 reads data from the disk 58 during unit time T) is calculated based on t/T (i.e., Pk=t/T), and value of t is cleared, and the timing is restarted. Here, t is the time that the disk player spends reading data from the disk during unit time T, and k is used to denote a single block (see FIG. 3). Processing then proceeds to step 14.

Step 14: In this step, it is determined whether k>m. If yes, this means that m units of time T have passed and processing proceeds to step 15. If no, this means that fewer than m units of time T have passed, and processing proceeds to step 18.

Step 15: In this step, it is determined whether, in each of m previous consecutive units of time periods T (from the current Pk), the proportion of time that the disk player spends reading data from the disk is greater than H. In other words, are each of Pk, Pk−1 . . . Pk−m+2, and Pk−m+1 greater than H? If the proportion of time that the disk player 50 spends reading data from the disk 58 is greater than H for each of m consecutive units of time T, then processing proceeds to step 19 to increase the rotational speed. If the proportion of time that the disk player 50 spends reading data from the disk 58 is not greater than H for each of m previous consecutive units of time T, then processing proceeds to step 16.

Step 16: In this step, it is determined whether k>n. If yes, this means that n units of time T have passed and processing proceeds to step 17. If no, this means that fewer than n units of time T have passed, and processing proceeds to step 18.

Step 17: In this step, it is determined whether, in each of n previous consecutive units of time periods T (from the current Pk), the proportion of time that the disk player 50 spends reading data from the disk 58 is less than L. In other words, are each of Pk, Pk−1 . . . Pk−n+2, and Pk−n+1 less than L? If the proportion of time that the disk player 50 spends reading data from the disk 58 is less than L for each of n consecutive units of time T, then processing proceeds to step 20 to decrease the rotational speed. If the proportion of time that the disk player 50 spends reading data from the disk 58 is not less than L for each of n previous consecutive units of time T, then processing proceeds to step 18.

Step 18: The values of Pk−1 . . . Pk−n+1 are updated by shifting the values of Pk−1 . . . Pk−n+1. For example, Pk−n+1=the current Pk−n+2; . . . Pk−m+1 =the current Pk−m+2; . . . Pk−2=the current Pk−1; Pk−1=the current Pk are set, and processing returns to step 11. This shifting allows for the new Pk to be calculated.

Step 19: In this step, the rotational speed is increased by the processor 52. The speed can be increased by using a number of different techniques, depending on the desired parameters and applications. For example, each incremental speed increase can be the same. As another example, a table (stored in the ROM 54) can be used to store a number of pre-set increases, such as (but not limited to) 1000, 2000, 4000, 6000 rpm, etc. Thus, the first increase might be by 1000 rpm, the second increase would be by 2000 rpm, then the next increase would be by 4000 rpm, and so on. If such a technique is implemented, then any subsequent decreases (see step 20) would have to follow the same progression, so that if the most recent speed increase was by 400 rpm, then a subsequent speed decrease would also be by 400 rpm, then the next speed decrease would be by 200 rpm, and so on. Then, Pk=(H+L)/2 is set so as to set Pk to a value between H and L to prevent another immediate increase or decrease when the next Pk is calculated in step 13. Processing then proceeds to step 18.

Step 20: In this step, the rotational speed is decreased using principles similar to those explained above in connection with step 19. Then Pk=(H+L)/2 is set (for the same reason as for step 19 above), and processing then proceeds to step 18.

As an alternative, steps 16 and 17 can be performed before steps 14 and 15 because these two procedures are independent of each other.

In addition, m and n can be adjusted. For example, if m and n are increased to obtain a more stable speed change, this will carry with it an increase in the response time (i.e., more time is needed to achieve the required speed). To illustrate, assume that T=0.64 seconds. If m=4, then 0.64*4= 2.56 seconds are required to increase the rotational speed. On the other hand, if m=6, then 0.64*6=3.84 seconds are required to increase the rotational speed.

Figure 3:
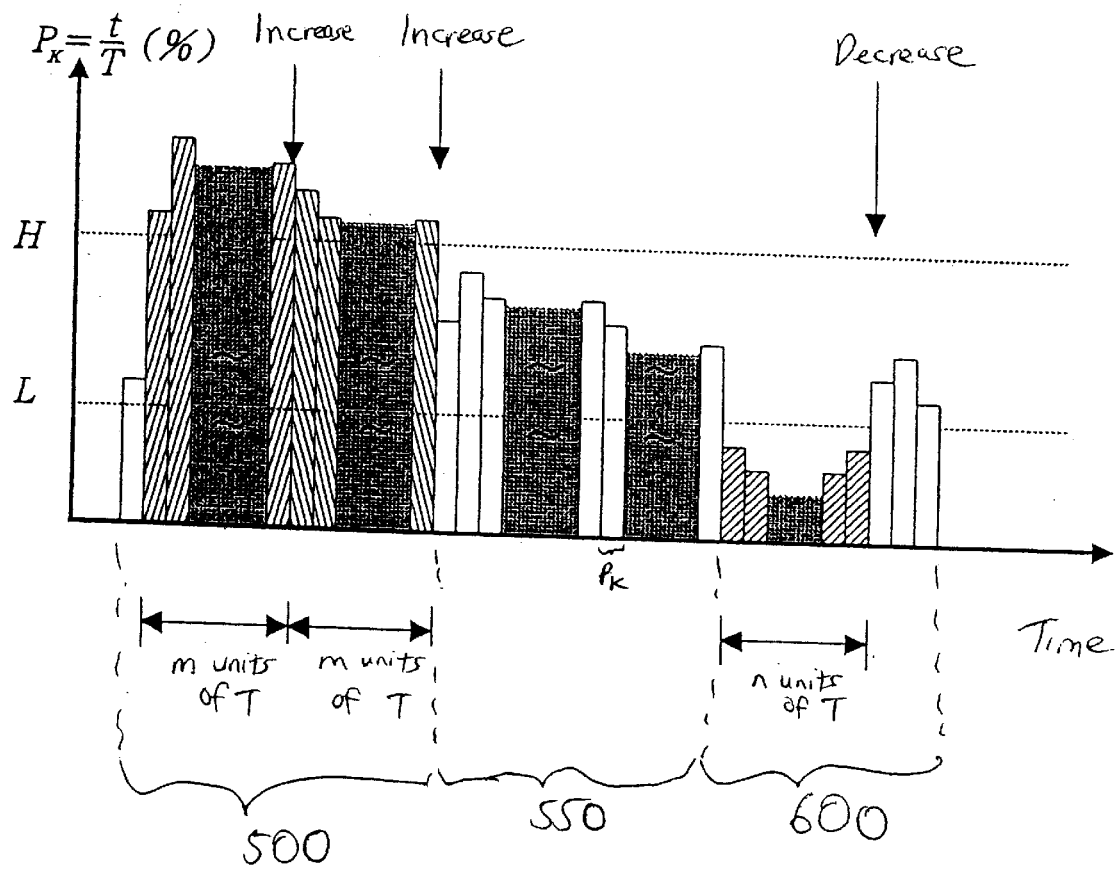
FIG. 3 is a chart that illustrates the relationship between Pk (i.e., the proportion of the time during which the disk player reads data from the disk during unit time T) and the time during normal operation of the method of FIG. 2

According to the aforementioned method and as illustrated in FIG. 3, if the disk player 50 constantly reads data from the disk 58 for most of a given time period, this indicates that the disk player 50 is being overburdened, and the reading speed is less than the speed required by the computer system. Therefore, the rotational speed of the motor 56 should be increased to obtain a higher data transfer rate to meet the requirement of the computer system. On the other hand, if the disk player 50 reads data from the disk 58 for only a small part of a given time period, it indicates that the data transfer rate at the present rotational speed is much greater than that needed by the computer system. Thus, the rotational speed of the motor 56 should be decreased, and the motor 56 should be controlled to work at a more efficient rotational speed that is sufficient for the transfer rate required by the computer system. For example, FIG. 3 illustrates that the rotational speed is increased when Pk exceeds H for m periods time T during the period 500. During the period 550, Pk is between the H and L values, so no changes in the rotational speed are needed. Then, the rotational speed is decreased when Pk is less than L for n periods time T during the period 600.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method for controlling the rotational speed of a disk player, comprising:

(a) calculating the proportion of time (Pk) which the disk player spends reading data from the disk during a unit time T;

(b) increasing the rotational speed of the disk player if the proportion of time that the disk player spends reading data from the disk is greater than a first threshold during each of m consecutive units of time T; and (c) decreasing the rotational speed of the disk player if the proportion of time that the disk player spends reading data from the disk is less than a second threshold during each of n consecutive units of time T.

2. The method of claim 1, wherein the first threshold is greater than the second threshold.

3. The method of claim 1, wherein Pk is calculated by dividing the actual time spent reading data from the disk by the unit time T.

4. The method of claim 1, further including shifting the values of a predetermined number of previous consecutive Pk values.

5. The method of claim 1, further including setting Pk to a value that is between the values of the first threshold and the second threshold after performing either step (b) or step (c).

* * * * *